United States Patent
Niu et al.

(10) Patent No.: US 12,479,364 B2
(45) Date of Patent: Nov. 25, 2025

(54) VEHICLE REARVIEW DISPLAY SYSTEM WITH ORIENTATION SENSING

(71) Applicant: Gentex Corporation, Zeeland, MI (US)

(72) Inventors: Xiaoxu Niu, Grand Rapids, MI (US); Joshua D. Lintz, Allendale, MI (US); David J. Cammenga, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 184 days.

(21) Appl. No.: 18/113,241

(22) Filed: Feb. 23, 2023

(65) Prior Publication Data

US 2023/0271555 A1    Aug. 31, 2023

Related U.S. Application Data

(60) Provisional application No. 63/313,808, filed on Feb. 25, 2022.

(51) Int. Cl.
| | |
|---|---|
| *H04N 23/61* | (2023.01) |
| *B60R 1/26* | (2022.01) |
| *H04N 5/262* | (2006.01) |
| *H04N 23/695* | (2023.01) |

(52) U.S. Cl.
CPC ............ *B60R 1/26* (2022.01); *H04N 5/2628* (2013.01); *H04N 23/61* (2023.01); *H04N 23/695* (2023.01); *B60R 2300/105* (2013.01); *B60R 2300/20* (2013.01); *B60R 2300/8066* (2013.01)

(58) Field of Classification Search
CPC . B60R 1/26; B60R 2300/105; B60R 2300/20; B60R 2300/8066; B60R 2001/1253; B60R 1/00; B60R 1/12; H04N 5/2628; H04N 23/61; H04N 23/695; H04N 23/60
See application file for complete search history.

(56) References Cited

U.S. PATENT DOCUMENTS

| | | | |
|---|---|---|---|
| 6,140,933 | A  | 10/2000 | Bugno et al. |
| 6,572,233 | B1 | 6/2003  | Northman et al. |
| 6,928,366 | B2 | 8/2005  | Ockerse et al. |
| 8,237,909 | B2 | 8/2012  | Ostreko et al. |
| 8,339,526 | B2 | 12/2012 | Minikey, Jr. et al. |

(Continued)

FOREIGN PATENT DOCUMENTS

| | | |
|---|---|---|
| CN | 112734841 A  | 4/2021 |
| JP | 2012096688 A | 5/2012 |

(Continued)

*Primary Examiner* — Alazar Tilahun
(74) *Attorney, Agent, or Firm* — Price Heneveld LLP; Brian James Brewer

(57) ABSTRACT

A rearview apparatus for a vehicle includes a first measurement device configured to detect a vehicle orientation. The first measurement device is in connection with a portion of the vehicle that maintains a fixed relationship relative to a body of the vehicle. A second measurement device is configured to detect an apparatus orientation of the rearview apparatus, which is adjustable relative to the body of the vehicle. A controller is in communication with the first measurement device and the second measurement device. The controller is configured to identify an orientation difference between the vehicle orientation and the apparatus orientation.

19 Claims, 5 Drawing Sheets

(56) References Cited

U.S. PATENT DOCUMENTS

| | | | |
|---|---|---|---|
| 8,411,245 B2 | 4/2013 | Lee et al. | |
| 8,775,031 B1 * | 7/2014 | Bankhead | B60R 1/025 |
| | | | 701/22 |
| 10,195,995 B2 | 2/2019 | Boehm | |
| 2014/0340516 A1 * | 11/2014 | Vojtisek | B60R 1/23 |
| | | | 348/148 |
| 2016/0042543 A1 * | 2/2016 | Hashimoto | H04N 5/265 |
| | | | 345/629 |
| 2018/0316868 A1 * | 11/2018 | Tschirhart | H04N 7/183 |
| 2019/0266751 A1 | 8/2019 | Noble et al. | |
| 2019/0332866 A1 * | 10/2019 | Beall | H04N 23/698 |
| 2020/0086792 A1 * | 3/2020 | Kikuchi | H04N 5/57 |

FOREIGN PATENT DOCUMENTS

| | | | |
|---|---|---|---|
| KR | 19980064403 A | 10/1998 | |
| KR | 20140055354 A | 5/2014 | |

* cited by examiner

VEHICLE REARVIEW DISPLAY SYSTEM WITH ORIENTATION SENSING

CROSS-REFERENCE TO RELATED APPLICATIONS

This application claims priority under 35 U.S.C. § 119 (e) and the benefit of U.S. Provisional Application No. 63/313,808 entitled MIRROR ORIENTATION SENSING SYSTEM, filed on Feb. 25, 2022, by Niu et al., the entire disclosure of which is incorporated herein by reference.

TECHNICAL FIELD

The present disclosure generally relates to an orientation sensing system for a vehicle and more specifically to a system that detects the orientation of a rearview apparatus in a vehicle.

SUMMARY

According to one aspect of the present disclosure, a rearview apparatus for a vehicle includes a first measurement device configured to detect a vehicle orientation. The first measurement device is in connection with a portion of the vehicle that maintains a fixed relationship relative to a body of the vehicle. A second measurement device is configured to detect an apparatus orientation of the rearview apparatus, which is adjustable relative to the body of the vehicle. A controller is in communication with the first measurement device and the second measurement device. The controller is configured to identify an orientation difference between the vehicle orientation and the apparatus orientation.

The disclosure further provides for a method for controlling a rearview apparatus for a vehicle. The method includes identifying a first orientation of the vehicle relative to an operating environment of the vehicle and identifying a second orientation of the review apparatus relative to the operating environment. Exterior image data is captured demonstrating a portion of the operating environment. The exterior image data is offset, thereby generating a display data based on the first orientation and the second orientation. The display data is presented on the rearview apparatus.

According to yet another aspect, a rearview apparatus for a vehicle includes a first measurement device configured to detect a vehicle orientation as a plurality of vehicle axial rotations. The first measurement device is in connection with a portion of the vehicle that maintains a first fixed relationship relative to a body of the vehicle. A second measurement device is configured to detect an apparatus orientation of the rearview apparatus as a plurality of apparatus axial rotations. The second measurement device maintains a second fixed relationship with the rearview apparatus and is adjustable relative to the body of the vehicle. The rearview apparatus further includes a display device disposed in a housing of the rearview apparatus and a controller in communication with the first measurement device and the second measurement device. The controller is configured to identify an orientation difference based on a comparison of the apparatus axial rotations to the vehicle axial rotations. The controller further generates adjusted image data corrected for the orientation difference and displays the adjusted image data on the display device.

These and other features, advantages, and objects of the present disclosure will be further understood and appreciated by those skilled in the art by reference to the following specification, claims, and appended drawings.

BRIEF DESCRIPTION OF THE DRAWINGS

The present disclosure will become more fully understood from the detailed description and the accompanying drawings, wherein.

DETAILED DESCRIPTION OF EMBODIMENTS

Figure 1:
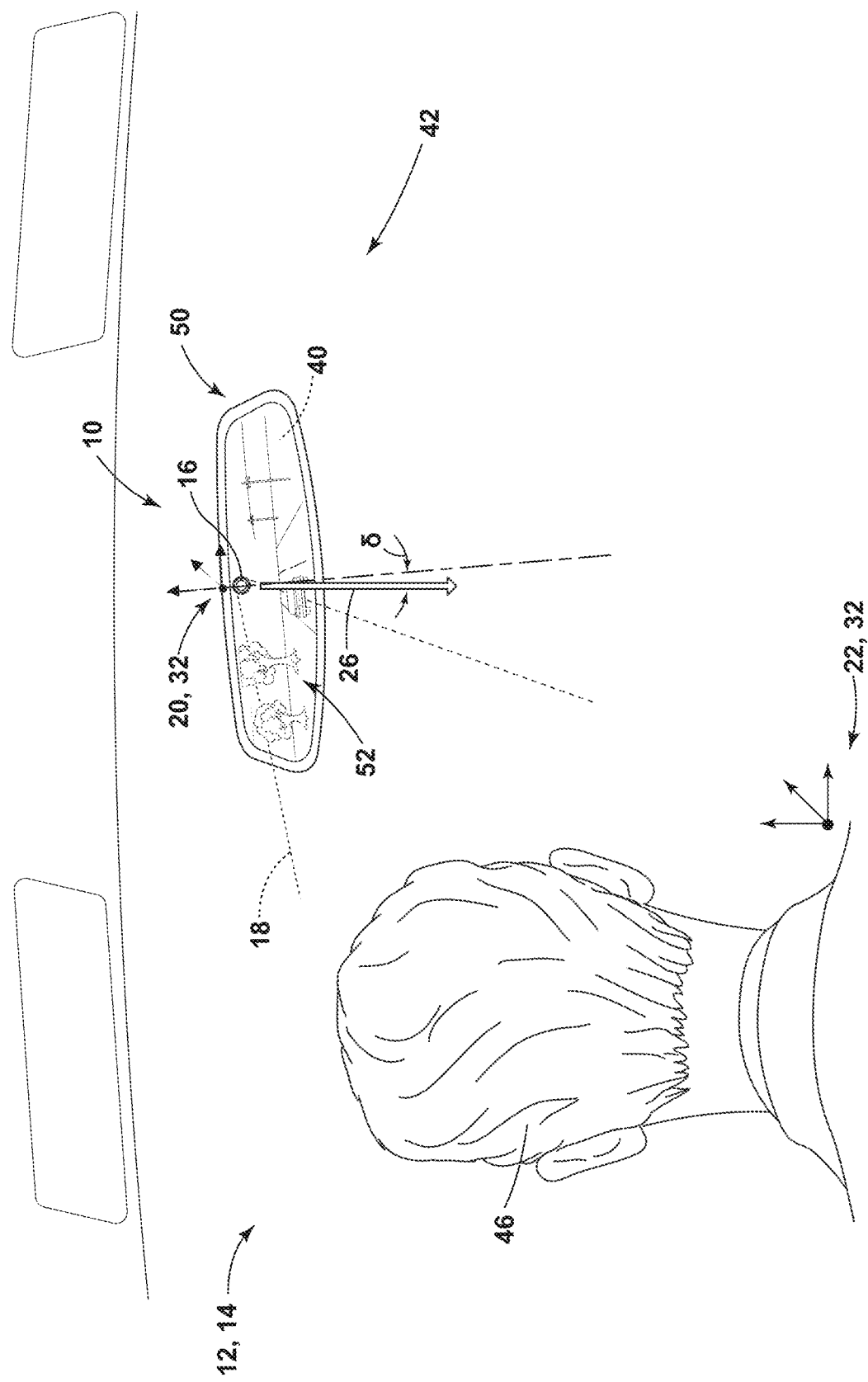
FIG. 1 is a projected view demonstrating an interior of a vehicle comprising a display system.

The present illustrated embodiments reside primarily in combinations of method steps and apparatus components related to an image sensor system and method thereof. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Figure 2:
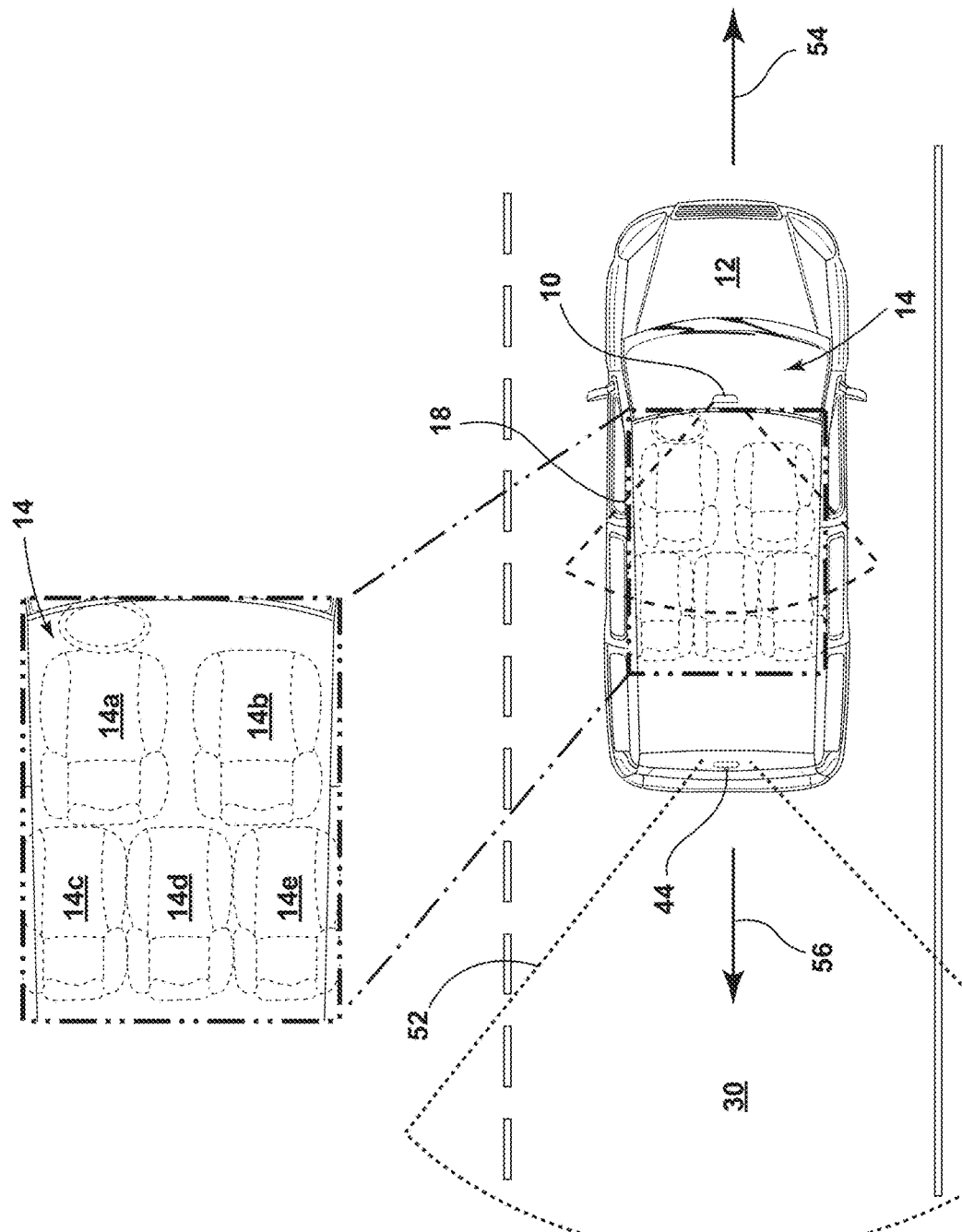
FIG. 2 is a top schematic view of a vehicle demonstrating a field of view of an imager of a display system.

Referring to FIGS. 1 and 2, a rearview apparatus 10 is shown incorporated in a passenger compartment 14 of a vehicle 12. As provided in various exemplary embodiments, the rearview apparatus 10 may include a camera 16 or imager configured to capture image data in a field of view 18 within the passenger compartment 14. As shown, an apparatus orientation 20 is exemplified by a first coordinate system, which may be adjusted relative to a vehicle orientation 22 exemplified by a second coordinate system. As discussed later in reference to FIGS. 3A and 3B, the rearview apparatus 10 may be adjustably mounted to a portion of the vehicle 12 via a mounting apparatus or assembly. In this configuration, the apparatus orientation 20 may be adjusted relative to the vehicle orientation by various operators of the vehicle 12.

Due to the adjustment of the apparatus orientation 20, a direction of the field of view 18 of the camera 16 may vary based on an orientation difference $\delta$. As shown, the orientation difference $\delta$ is represented as difference in a vertical direction (e.g., y-axis) of the apparatus orientation 20 relative to the vehicle orientation 22. However, as will be understood by those skilled in the art, the orientation difference δ may include rotational components in each axis (x, y, z) of the associated coordinate systems. Further, the orientation difference δ is shown in FIG. 1 relative to a gravity vector 26. Though demonstrated in FIG. 1 as being aligned with the gravity vector 26, the vehicle orientation 22 may vary throughout the operation of the vehicle 12 due to variations in slopes and terrain associated with an operating surface 30 of the vehicle. As a result, the vehicle orientation 22 may vary relative to the gravity vector 26 and the apparatus orientation 20 may further vary based on the relative orientation or orientation difference δ between the rearview apparatus 10 and the vehicle 12. Such differences in orientation may create challenges in determining the apparatus orientation 20 relative to the vehicle orientation 22.

In various implementations, the disclosure may provide for a plurality of measurement devices 32 configured to detect and monitor the apparatus orientation 20 as well as the vehicle orientation 22. The measurement devices 32 may correspond to accelerometers, gyroscopes, magnetometers, inertial measurement units (IMUS), or other devices that may detect an orientation or direction of elements in space. In various instances, each of the measurement devices may correspond to an accelerometer implemented in combination with a magnetometer. More generally, the measurement devices 32 implemented for the apparatus 10 may comprise at least one accelerometer and at least one magnetometer. The measurement devices 32 may be implemented in compact packages in various portions of the rearview apparatus and the vehicle 12 and are represented by the coordinate systems for each of the orientations 20, 22. Further details describing exemplary configurations of the measurement devices are provided in reference to FIGS. 3A and 3B.

In an exemplary implementation, the measurement devices 32 may comprise a first measurement device 32a and a second measurement device 32b. The first measurement device 32a may be configured to detect the vehicle orientation 22 and, accordingly, may be in connection with a portion of the vehicle 12 that maintains a fixed relationship relative to a body of the vehicle 12. The measurement devices 32 may further include a second measurement device 32b configured to detect the apparatus orientation 20 of the rearview apparatus 10. The second measurement device 32b may be in connection with a portion of the rearview apparatus 10 and may be incorporated within a housing 34 of the rearview apparatus 10. In this configuration, the first measurement device 32a may detect the vehicle orientation 22, while the second measurement device 32b may detect the apparatus orientation 20. Based on the orientation measurements (e.g., rotations about the x, y, z axes) provided by the measurement devices 32, a controller 40 of the rearview apparatus 10, or more generally forming a component of an orientation measurement system 42, may identify the orientation difference δ. Based on the orientation difference δ, the rearview apparatus 10, or more generally the orientation measurement system 42, may process and offset or adjust image data received from the camera 16 or interior camera, a rearview camera 44, or exterior camera or various image data. Additionally, the controller 40 may be configured to apply the orientation difference δ to identify the relative orientation of the field of view 18 within the passenger compartment 14.

Referring to FIG. 1, an operator or, more generally, a passenger 46 of the vehicle 12 is shown positioned within the field of view 18 of the camera 16. In operation, the controller 40 may monitor the image data captured by the camera 16 to monitor a location of the passenger 46 within the passenger compartment 14. Similarly, the controller 40 may monitor the image data to identify locations associated with activity within the passenger compartment 14. In cases where the field of view 18 of the camera 16 maintains a fixed relationship relative to the vehicle orientation 22, the controller 40 may be calibrated to attribute activity in different regions of the field of view 18 to activity in corresponding regions 14a, 14b, 14c, 14d, 14e, etc. of the passenger compartment 14. However, with the camera 16 incorporated in the rearview apparatus 10, the apparatus orientation 20 may vary, such that the locations in the field of view 18 vary based on the angular adjustment of the apparatus 10. That is, due to the incorporation of the camera 16 in connection with the rearview apparatus 10, the adjustment of the apparatus orientation 20 causes the orientation and position of the field of view 18 within the passenger compartment 14 to vary.

In order to account for such changes in the direction of the field of view 18, the controller 40 may monitor the orientation difference δ and offset a relative position of the field of view 18 in the corresponding image data. In this way, the location in the passenger compartment 14 may be associated with an adjusted position in the image data, such that the locations of the passenger(s) 46 and activity within passenger compartment 14 may be accurately determined regardless of the orientation of the rearview apparatus 10. In this way, the coordinates of pixels or regions within the field of view 18 may be identified by the controller 40 to correspond to the corresponding regions 14a-14e of the passenger compartment depicted based on the offset locations of the pixels identified and tracked based on the orientation difference. Accordingly, the disclosure provides for improved operation of the camera 16 incorporated in a portion or component of a vehicle 12 that may vary in position or orientation relative to the vehicle orientation 22.

Still referring to FIGS. 1 and 2, in some implementations, the rearview apparatus 10 may include a display device 50 that may be configured to display image data captured by one or more additional interior cameras within the vehicle (e.g., a passenger or child monitoring camera) and/or the rearview camera 44. In such cases, the operation of the display device 50 may similarly be affected by the relative orientation of the rearview apparatus 10 to the vehicle 12. More specifically, when the apparatus orientation 20 of the rearview apparatus 10 and the display device 50 are adjusted relative to the vehicle orientation 22, the corresponding image data captured by one or more imagers or cameras (e.g., the rearview camera 44) may be skewed or rotated relative to the vehicle orientation 22. Such a skewed appearance may be distracting to a viewer.

Figure 4:
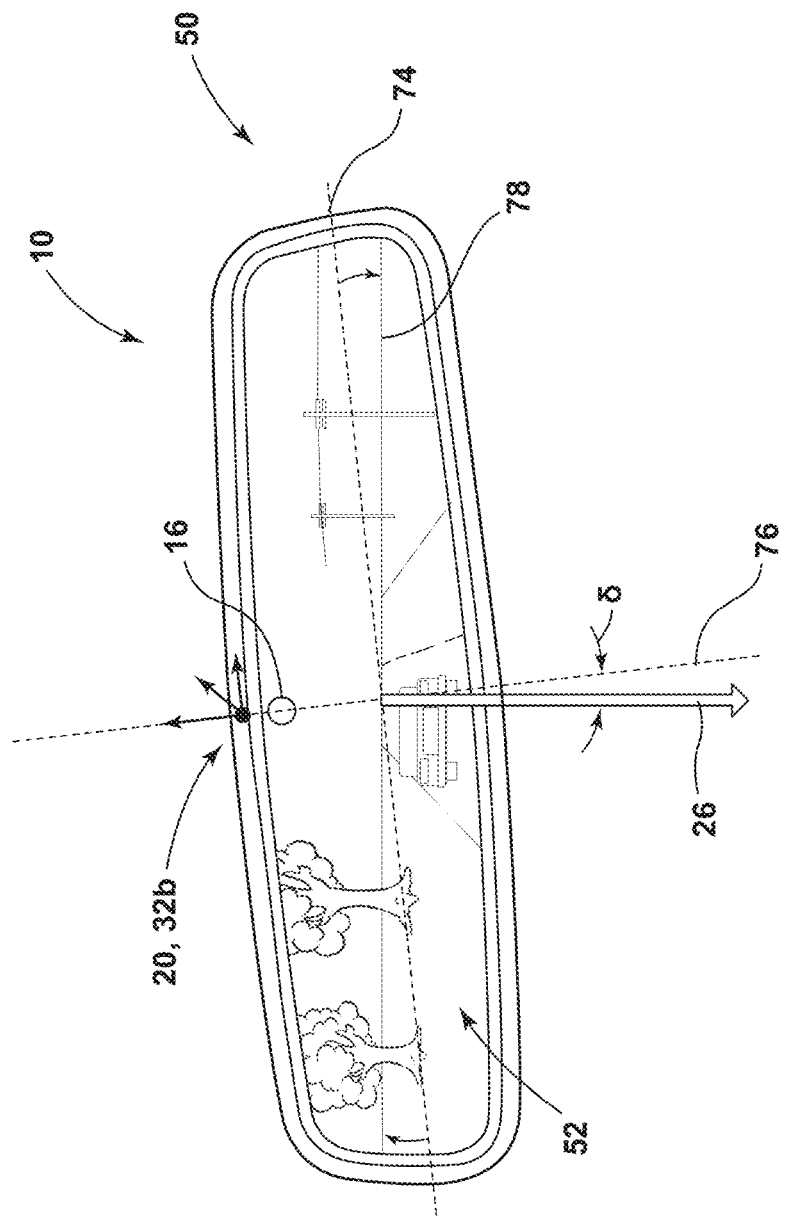
FIG. 4 is a diagram of a display device displaying image data corrected for a tilt of the display device.

In order to correct for the skewed appearance of the image data on the display device 50 as shown in FIG. 1, the controller 40 may adjust the image data to account for the relative angle between the rearview apparatus 10 and the vehicle 12. In such cases, the apparatus orientation 20 may be identified by the controller 40 as differing from the vehicle orientation 22 by the orientation difference δ. In response to the orientation difference δ, the controller 40 may adjust the orientation of the image data depicted on the display device 50 by the orientation difference δ. As a result, the image data may be adjusted to appear as though reflected from the screen depicted in a rearward field of view 52 of the rearview camera 44 as shown in FIG. 4. Again, though discussed in reference to the example of the rearview camera 44, the adjustment of the image data or demonstration on the display device 50 may be similarly applied to any camera or imager that maintains a fixed relationship relative to the body of the vehicle 12.

Referring now to FIG. 2, a top view of the vehicle 12 is shown demonstrating the rearward directed field of view 52. As previously described, the rearward field of view 52 may correspond to an exterior field of view that maintains a fixed relationship relative to the vehicle orientation 22. Accordingly, based on the orientation difference δ, the controller 40 may adjust the image data captured in the rearward field of view 52 or similar fields of view, such that the image data depicted on the display device 50 appears to be reflected from the local environment rather than skewed from the local environment based on the orientation difference δ. FIG. 2 further demonstrates reference directions demonstrating a forward direction 54 and a rearward direction 56 depicted as arrows on the operating surface 30 for clarity.

Figure 3B:
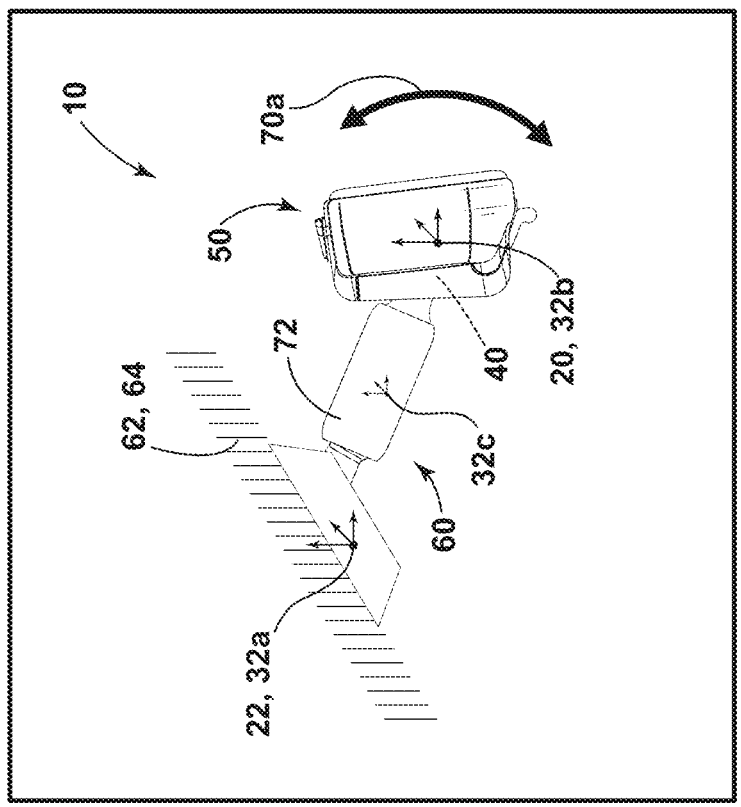
FIG. 3B is a side view of an interior rearview apparatus demonstrating a relative orientation relative to a vehicle.
Figure 3A:
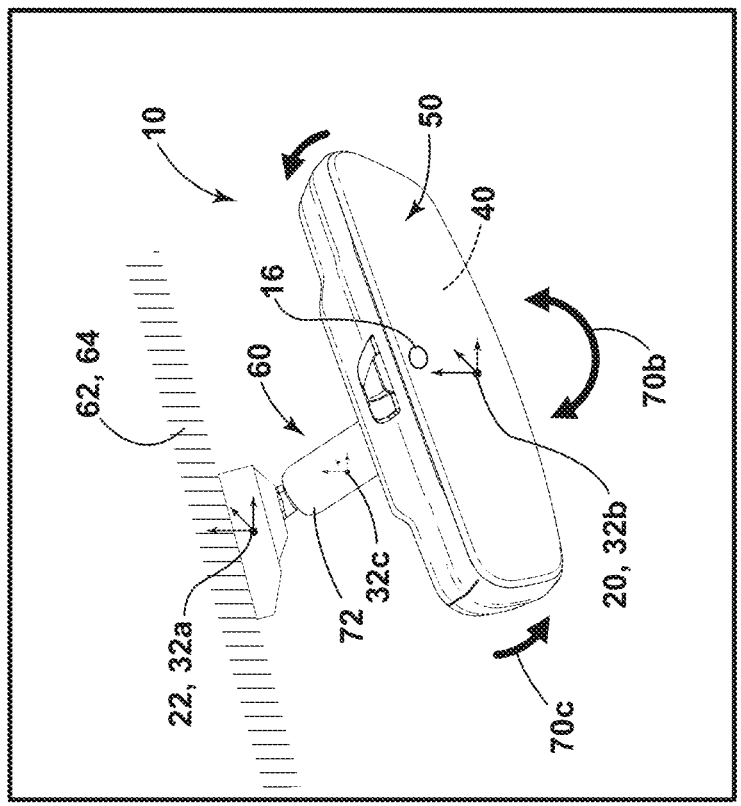
FIG. 3A is a front projected view of an interior rearview apparatus demonstrating a relative orientation relative to a vehicle.

Referring now to FIGS. 3A and 3B, projected depictions of the rearview apparatus 10 are shown demonstrating the adjustment of the apparatus orientation 20 relative to the vehicle orientation 22. As shown, the mounting assembly 60 provides for an adjustable connection between a windshield 62, header 64, or various portions of the vehicle 12. The mounting assembly 60 includes a fixed mount that is connected to a ball and socket interface that allows the rearview apparatus 10 to freely rotate about three axes. As shown, the apparatus orientation 20 may rotate about a transverse axis providing for pitch adjustment 70a, a longitudinal access providing for roll adjustment 70b, and a vertical axis providing for yaw adjustment 70c. In order to detect the orientation about the three axes of the coordinate system defining the apparatus orientation 20, each of the measurement devices 32 may incorporate an accelerometer and/or a magnetometer.

For example, each of the measurement devices 32 may incorporate a three-axis accelerometer that may be used in combination with a three-axis magnetometer. In operation, the accelerometer may measure the components of Earth's gravity and the magnetometer may measure the components of Earth's magnetic field. Since both the accelerometer and magnetometer are fixed in their relationship to the corresponding orientations measured, that is, the apparatus orientation 20 and the vehicle orientation 22, the associated readings detected by the measurement devices 32 change according to the orientation of the rearview apparatus 10 and the vehicle 12, respectively. Though described as three-axis devices, the orientations 20, 22 may be identified by the controller 40 based on information reported by a subset of the axes noted (e.g., two-axes from the accelerometer and one-axis from the magnetometer).

In an exemplary implementation, the pitch 70a and roll 70b may be calculated based on the data collected from the accelerometer. Additionally, yaw 70c, as shown in FIG. 3A, may rotate about a z-axis, which may align with the gravity vector 26. A single axis of the magnetometer may be added to provide a north facing reference axis. The yaw 70c may then be calculated based on the reading of the magnetometer deviating from north. Accordingly, based on the data collected by the measurement devices 32 throughout the operation of the vehicle 12, the disclosure may provide for adjustments in various vehicle systems that may change or be dependent on the orientation difference δ.

Though described in reference to specific examples, the disclosure may further provide for similar applications of the measurement devices 32 in the vehicle 12. For example, in some cases, the orientation difference δ may be detected by the controller 40 to activate one or more functions of the rearview apparatus 10. In some cases, the rearview apparatus 10 may correspond to a display mirror that is capable of displaying image data as well as operating similar to a conventional rearview mirror. Examples of display assemblies that may be utilized with the disclosure may include U.S. Pat. No. 6,572,233 "REARVIEW MIRROR WITH DISPLAY;" U.S. Pat. No. 8,237,909 entitled "VEHICULAR REARVIEW MIRROR ASSEMBLY INCLUDING INTEGRATED BACKLIGHTING FOR A LIQUID CRYSTAL DISPLAY (LCD);" U.S. Pat. No. 8,411,245 "MULTI-DISPLAY MIRROR SYSTEM AND METHOD FOR EXPANDED VIEW AROUND A VEHICLE;" and U.S. Pat. No. 8,339,526 "VEHICLE REARVIEW MIRROR ASSEMBLY INCLUDING A HIGH INTENSITY DISPLAY," which are incorporated herein by reference in their entirety. In such cases, the rearview apparatus may automatically transition from a display mode to a mirror mode, such that a user may be able to implement the rearview apparatus 10 as a vanity mirror. Accordingly, the controller 40 may adjust the state of the rearview apparatus 10 from a display state to a mirror state based on the orientation difference δ. Similarly, the display state may be activated in a child or passenger monitoring mode that may be activated in response to the orientation difference δ indicating the field of view 18 directed into a back seat as opposed to a common orientation angled toward the operator. Additionally, in response to the rearview apparatus 10 being tilted in a downward direction, another camera view (e.g., a trailer hitch or auxiliary camera view) may be activated in response to the orientation difference δ indicating such an adjustment. In some cases, the yaw adjustment 70c of the rearview apparatus 10 may cause the image data to similarly pan or adjust similar to the response of reflected light in a mirror. Accordingly, the disclosure may provide for a variety of applications and features in relation the camera 16 and the display 50.

In some embodiments, the mounting assembly 60 may include a dual ball mount with an intermediate linkage 72 disposed between opposing end portions. For clarity, a dual ball mount may provide for a ball and socket joint on opposing ends of the intermediate linkage 72. In such cases, a third measurement device 32C may be incorporated in connection with the intermediate linkage 72. For example, the third measurement device 32c may be incorporated as an additional orientation measurement device in the form of an accelerometer, magnetometer, and/or other forms of IMUs. Additionally, the third measurement device 32c may comprise one or more Hall Effect sensors in connection with end portions of the intermediate linkage 72. Similarly, the angular orientation of the opposing end portions of the intermediate linkage 72 may be detected by one or more potentiometers or other sensors. In this configuration, the angular orientation of the intermediate linkage 72 may be detected relative to the vehicle orientation 22 and the apparatus orientation 20. Accordingly, the controller 40 may be configured to determine the orientation of the rearview apparatus 10 relative to the vehicle 12 by identifying the vehicle orientation 22 and the apparatus orientation 20 in conjunction with the intermediate orientation of the intermediate linkage 72.

Referring now to FIG. 4, a representative diagram of the rearview apparatus 10 is shown demonstrating image data from the rearward field of view 52 that is corrected based on the orientation difference δ as identified by the controller 40. As previously discussed, the adjustment of the apparatus orientation 20 may result in the display device 50 being skewed in relation to the vehicle orientation 22. As a result, the image data demonstrated on the display device 50 may not appear aligned with the exterior environment as may be expected by a user or operator of the rearview apparatus 10. To be clear, without correction for the orientation difference, the display device 50 may demonstrate the image data aligned with a lateral axis 74 and a vertical axis 76 of the rearview apparatus 10. However, as shown in FIG. 4, the controller 40 may offset or rotate the image data captured by the rearview camera 44 or exterior camera, such that the image data is demonstrated aligned with the vehicle orientation 22, which may correspond to a horizon 78 generally perpendicular to the gravity vector 26. In this way, the orientation measurement system 42 provided by the disclosure may update the display of the image data, such that it is depicted similar to a conventional rearview mirror.

Figure 5:
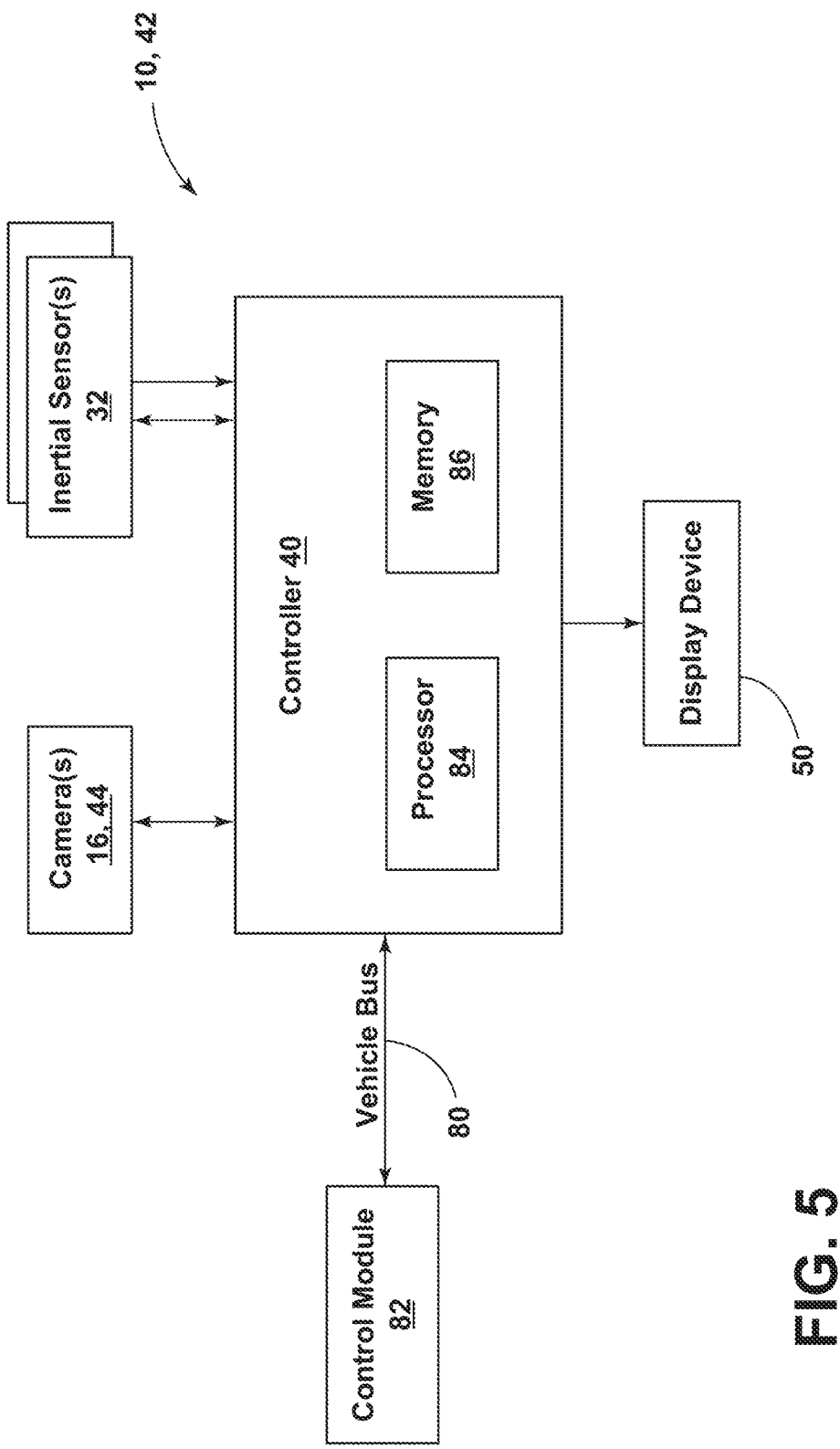
FIG. 5 is a block diagram of a display system in accordance with the disclosure.

Referring now to FIG. 5, a block diagram of the rearview apparatus 10 and the orientation measurement system 42 is shown. As discussed in various implementations, the controller 40 may be in communication with one or more cameras 16, 44, which may include various forms of image sensors. Additionally, the controller 40 may be in communication with various measurement devices 32, which may correspond to accelerometers, magnetometers, IMUs, or similar devices configure to measure the orientation of an object in space. In some implementations, the controller 40 may further be in communication with the display device 50. The display device may be implemented by various display technologies including light-emitting diode (LED) displays, organic LED (OLED) displays, or various other display technologies.

The controller 40 may be in communication with various devices and systems of the vehicle 12 via a vehicle bus 80. The vehicle bus 80 may provide the controller 40 with communications from a vehicle control module 82 as well as various electronic systems throughout the vehicle. The vehicle control module 82 may be in communication with various operating systems or entertainment systems of the vehicle and may be configured to communicate and identify various vehicle operating conditions via the vehicle bus 80. For example, the control module 82 may communicate operating conditions, including a speed, direction light or turn indicator statuses, gear selection, or various information related to the operation of the vehicle 12. The vehicle bus 80 may be implemented using any suitable standard communication bus, such as a control area network (CAN) bus.

In order to provide for the various programming and processing steps described throughout this application, the controller 40 may include a processor 84 operable to process the image data as supplied in analog or digital form in the imager 14. For example, the controller 40 may be implemented as a plurality of processors, a multicore processor, or any combination of processors, circuits, and peripheral processing devices. The controller 40 may further comprise a memory 86. The memory 86 may comprise various forms of memory, for example, random access memory (RAM), dynamic RAM (DRAM), synchronous DRAM (SDRAM), and other forms of memory configured to store digital information. The memory 86 may be configured to store the image data for processing. Processing the image data may comprise scaling and cropping the image data to adjust a position and apparent size of the image data as it is output to a screen of the display device 50.

According to some aspects of the disclosure, a rearview apparatus for a vehicle comprises a first measurement device configured to detect a vehicle orientation and in connection with a portion of the vehicle that maintains a fixed relationship relative to a body of the vehicle. The rearview apparatus further includes a second measurement device configured to detect an apparatus orientation of the rearview apparatus and in connection with the rearview apparatus, wherein the apparatus orientation is adjustable relative to the body of the vehicle. A controller in communication with the first measurement device and the second measurement device is also provided, wherein the controller is configured to identify an orientation difference between the vehicle orientation and the apparatus orientation.

According to various aspects, the disclosure may implement one or more of the following features or configurations in various combinations:
  a camera in connection with the rearview apparatus, wherein the camera maintains the apparatus orientation of the rearview apparatus;
  the camera is configured to capture image data in a field of view depicting a passenger compartment of the vehicle;
  the controller is configured to identify a portion of the passenger compartment depicted in the field of view based on the orientation difference;
  the controller is configured to identify a position of a passenger in the passenger compartment by accounting for the orientation difference of the field of view;
  the vehicle orientation is measured by the first measurement device as a plurality of vehicle axial rotations;
  the apparatus orientation is measured by the second measurement device as a plurality of apparatus axial rotations;
  the controller compares the vehicle axial rotations to the apparatus axial rotations to determine the orientation difference;
  the first measurement device is in connection with a mounting assembly that connects the rearview apparatus to the vehicle;
  the measurement devices each comprise at least one accelerometer configured to report accelerometer data and at least one magnetometer configured to detect magnetometer data;
  a roll and a pitch are identified by the controller in response to accelerometer data and a yaw is identified in response to magnetometer data;
  the camera is configured to capture image data in an exterior field of view depicting a rearward directed scene relative to the vehicle; and/or
  a display device disposed in a housing of the rearview apparatus, wherein the controller is further configured to generate adjusted image data corrected for the orientation difference; and display the adjusted image data on the display device.

According to another aspect of the disclosure, a method for controlling an interior camera for a vehicle comprises identifying a first orientation of the vehicle relative to an operating environment of the vehicle and identifying a second orientation of the interior camera relative to the operating environment. The method further includes capturing interior image data demonstrating a passenger compartment of the vehicle, offsetting the interior image data generating the display data based on the first orientation and the second orientation, and presenting the display data on a vehicle display apparatus.

According to various aspects, the disclosure may implement one or more of the following features or step in various combinations:
  the offsetting of the interior image data comprises identifying an orientation difference between the first orientation and the second orientation;

manually adjusting the second orientation of the interior camera relative to the vehicle;

the interior image data depicts a passenger compartment of the vehicle;

identifying a portion of the passenger compartment depicted in the field of view based on the orientation difference; and/or identifying a position of a passenger in the passenger compartment by accounting for the orientation difference of the field of view.

According to another aspect of the invention, a rearview apparatus for a vehicle comprises a camera in connection with the vehicle and configured to capture image data depicting a passenger compartment of the vehicle. The apparatus further including a first measurement device configured to detect a vehicle orientation as a plurality of vehicle axial rotations, wherein the first measurement device is in connection with a portion of the vehicle that maintains a first fixed relationship relative to a body of the vehicle and a second measurement device configured to detect an apparatus orientation of the rearview apparatus as a plurality of apparatus axial rotations, wherein the second measurement device maintains a second fixed relationship with the rearview apparatus, wherein the apparatus orientation is adjustable relative to the body of the vehicle. A display device is disposed in a housing of the rearview apparatus, and a controller is in communication with the first measurement device and the second measurement device. The controller is configured to identify an orientation difference based on a comparison of the apparatus axial rotations to the vehicle axial rotations and identify a position of a passenger or a portion of the passenger compartment depicted in the field of view based on the orientation difference.

It will be appreciated that embodiments of the disclosure described herein may be comprised of one or more conventional processors and unique stored program instructions that control one or more processors to implement, in conjunction with certain non-processor circuits, some, most, or all of the functions of an image sensor system and method thereof, as described herein. The non-processor circuits may include, but, are not limited to, signal drivers, clock circuits, power source circuits, and/or user input devices. Alternatively, some or all functions could be implemented by a state machine that has no stored program instructions, or in one or more application specific integrated circuits (ASICs), in which each function or some combinations of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It should be appreciated by those skilled in the art that the above-described components may be combined in additional or alternative ways not explicitly described herein. Modifications of the various implementations of the disclosure will occur to those skilled in the art and to those who apply the teachings of the disclosure. Therefore, it is understood that the embodiments shown in the drawings and described above are merely for illustrative purposes and not intended to limit the scope of the disclosure, which is defined by the following claims as interpreted according to the principles of patent law, including the Doctrine of Equivalents.

What is claimed is:

1. A rearview apparatus for a vehicle, comprising:
a first measurement device configured to detect a vehicle orientation and in connection with a portion of the vehicle that maintains a fixed relationship relative to a body of the vehicle;
a second measurement device configured to detect an apparatus orientation of the rearview apparatus and in connection with the rearview apparatus, wherein the apparatus orientation is adjustable relative to the body of the vehicle; and
a controller in communication with the first measurement device and the second measurement device, wherein the controller is configured to identify an orientation difference between the vehicle orientation and the apparatus orientation.

2. The apparatus according to claim 1, further comprising:
a camera in connection with the rearview apparatus, wherein the camera maintains the apparatus orientation of the rearview apparatus.

3. The apparatus according to claim 2, wherein the camera is configured to capture image data in a field of view depicting a passenger compartment of the vehicle.

4. The apparatus according to claim 3, wherein the controller is configured to identify a portion of the passenger compartment depicted in the field of view based on the orientation difference.

5. The apparatus according to claim 3, wherein the controller is configured to identify a position of a passenger in the passenger compartment by accounting for the orientation difference of the field of view.

6. The apparatus according to claim 1, wherein the vehicle orientation is measured by the first measurement device as a plurality of vehicle axial rotations.

7. The apparatus according to claim 6, wherein the apparatus orientation is measured by the second measurement device as a plurality of apparatus axial rotations.

8. The apparatus according to claim 7, wherein the controller compares the vehicle axial rotations to the apparatus axial rotations to determine the orientation difference.

9. The apparatus according to claim 1, wherein the first measurement device is in connection with a mounting assembly that connects the rearview apparatus to the vehicle.

10. The apparatus according to claim 1, wherein the measurement devices each comprise at least one accelerometer configured to report accelerometer data and at least one magnetometer configured to detect magnetometer data.

11. The apparatus according to claim 10, wherein a roll and a pitch are identified by the controller in response to accelerometer data and a yaw is identified in response to magnetometer data.

12. The apparatus according to claim 11, wherein the camera is configured to capture image data in an exterior field of view depicting a rearward directed scene relative to the vehicle.

13. The apparatus according to claim 12, further comprising:
a display device disposed in a housing of the rearview apparatus; and
wherein the controller is further configured to:
generate adjusted image data corrected for the orientation difference; and
display the adjusted image data on the display device.

14. A method for controlling an interior camera for a vehicle comprising:
identifying a first orientation of the vehicle relative to an operating environment of the vehicle;

identifying a second orientation of the interior camera relative to the operating environment;

capturing interior image data demonstrating a passenger compartment of the vehicle;

offsetting the interior image data generating the display data based on the first orientation and the second orientation, wherein the offsetting of the interior image data comprises identifying an orientation difference between the first orientation and the second orientation; and presenting the display data on a vehicle display apparatus.

15. The method according to claim 14, further comprising:

manually adjusting the second orientation of the interior camera relative to the vehicle.

16. The method according to claim 15, further comprising:

wherein the interior image data depicts a passenger compartment of the vehicle.

17. The method according to claim 16, further comprising:

identifying a portion of the passenger compartment depicted in the field of view based on the orientation difference.

18. The method according to claim 17, further comprising:

identifying a position of a passenger in the passenger compartment by accounting for the orientation difference of the field of view.

19. A rearview apparatus for a vehicle, comprising:

a camera in connection with the vehicle and configured to capture image data depicting a passenger compartment of the vehicle;

a first measurement device configured to detect a vehicle orientation as a plurality of vehicle axial rotations, wherein the first measurement device is in connection with a portion of the vehicle that maintains a first fixed relationship relative to a body of the vehicle;

a second measurement device configured to detect an apparatus orientation of the rearview apparatus as a plurality of apparatus axial rotations, wherein the second measurement device maintains a second fixed relationship with the rearview apparatus, wherein the apparatus orientation is adjustable relative to the body of the vehicle;

a display device disposed in a housing of the rearview apparatus; and a controller in communication with the first measurement device and the second measurement device, wherein the controller is configured to:

identify an orientation difference based on a comparison of the apparatus axial rotations to the vehicle axial rotations; and identify a position of a passenger or a portion of the passenger compartment depicted in the field of view based on the orientation difference.

* * * * *